(12) United States Patent
Levy (10) Patent No.: US 12,261,966 B1
(45) Date of Patent: Mar. 25, 2025

(54) SYSTEMS AND METHODS FOR SERVER-BASED TRUST STORE DISCOVERY

(71) Applicant: Amazon Technologies, Inc., Reno, NV (US)

(72) Inventor: Marcel Andrew Levy, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 704 days.

(21) Appl. No.: 17/463,972

(22) Filed: Sep. 1, 2021

(51) Int. Cl.
| | |
|---|---|
| *H04L 9/32* | (2006.01) |
| *G06F 16/955* | (2019.01) |
| *G06F 18/214* | (2023.01) |
| *H04L 9/08* | (2006.01) |
| *H04L 67/02* | (2022.01) |
| *H04L 67/146* | (2022.01) |

(52) U.S. Cl.
CPC ........ *H04L 9/3265* (2013.01); *G06F 16/9562* (2019.01); *G06F 18/214* (2023.01); *H04L 9/0827* (2013.01); *H04L 9/3268* (2013.01); *H04L 67/02* (2013.01); *H04L 67/146* (2013.01)

(58) Field of Classification Search
CPC ... H04L 9/3265; H04L 9/0827; H04L 9/3268; H04L 67/02; H04L 67/146; G06F 16/9562; G06F 18/214
See application file for complete search history.

(56) References Cited

U.S. PATENT DOCUMENTS

| | | | | |
|---|---|---|---|---|
| 6,085,320 | A * | 7/2000 | Kaliski, Jr. | G07F 7/1008 713/168 |
| 6,134,551 | A * | 10/2000 | Aucsmith | H04L 9/14 |
| 6,324,648 | B1 * | 11/2001 | Grantges, Jr. | H04L 67/02 713/168 |
| 6,751,529 | B1 * | 6/2004 | Fouche | G05D 1/0858 244/164 |
| 9,888,037 | B1 * | 2/2018 | Sharifi Mehr | H04L 63/205 |
| 10,484,355 | B1 * | 11/2019 | Levy | H04L 63/068 |
| 10,708,256 | B1 * | 7/2020 | Kane-Parry | H04L 63/0823 |
| 11,258,823 | B2 * | 2/2022 | Dutta | H04L 63/166 |
| 2002/0165912 | A1 * | 11/2002 | Wenocur | H04L 51/00 709/203 |

(Continued)

FOREIGN PATENT DOCUMENTS

| | | | | |
|---|---|---|---|---|
| CA | 2703719 | C * | 7/2014 | ............. H04L 63/06 |
| CN | 106789090 | B * | 12/2019 | ......... H04L 63/0823 |

(Continued)

*Primary Examiner* — John B King
(74) *Attorney, Agent, or Firm* — Hogan Lovells US LLP (57) ABSTRACT

An automated server-based scheme allows a hosted service such as an individual computer system, computer application, or network service, to infer root certificate authorities present in client trust stores. Presenting a random selection of one or more digital certificates to a given client seeking a favorite icon URL, in response to a Transport Layer Security (TLS) connection request from the client, allows the service operator's trained machine learning system to define a customized set of potentially-trusted root certificate authorities based on learned successes and failures of connections with the given client, as well as other parties. The hosted service operator may employ a certificate manager and/or client-specific rules for presenting the certificates.

20 Claims, 5 Drawing Sheets

(56) References Cited

U.S. PATENT DOCUMENTS

| | | | | |
|---|---|---|---|---|
| 2004/0039911 A1* | 2/2004 | Oka | ............... | G06F 21/10 |
| | | | | 705/51 |
| 2006/0106836 A1* | 5/2006 | Masugi | ............... | G06F 21/33 |
| 2006/0143693 A1* | 6/2006 | Glickman | ............... | H04W 12/50 |
| | | | | 726/3 |
| 2008/0016196 A1* | 1/2008 | MacMillan | ............... | H04L 67/125 |
| | | | | 709/223 |
| 2008/0306782 A1* | 12/2008 | Ephrati | ............... | G06Q 30/0242 |
| | | | | 705/1.1 |
| 2009/0063232 A1* | 3/2009 | Lissack | ............... | G06Q 10/1095 |
| | | | | 705/7.19 |
| 2010/0009656 A1* | 1/2010 | Pang | ............... | H04L 9/3263 |
| | | | | 455/410 |
| 2010/0131765 A1* | 5/2010 | Bromley | ............... | H04L 9/006 |
| | | | | 713/175 |
| 2013/0040603 A1* | 2/2013 | Stahlberg | ............... | H04L 63/14 |
| | | | | 455/410 |
| 2013/0066959 A1* | 3/2013 | Brundage | ............... | G06F 11/0793 |
| | | | | 709/203 |
| 2014/0089782 A1* | 3/2014 | Cook | ............... | G06F 16/957 |
| | | | | 715/234 |
| 2014/0294175 A1* | 10/2014 | Boloker | ............... | G06T 1/005 |
| | | | | 380/30 |
| 2016/0110322 A1* | 4/2016 | Miller | ............... | G06F 40/143 |
| | | | | 715/758 |
| 2016/0142211 A1* | 5/2016 | Metke | ............... | H04L 63/0823 |
| | | | | 713/175 |
| 2017/0230320 A1* | 8/2017 | Knight | ............... | H04L 65/75 |
| 2018/0278611 A1* | 9/2018 | Tan | ............... | H04L 9/3268 |
| 2018/0322403 A1* | 11/2018 | Ron | ............... | G06N 3/08 |
| 2019/0190954 A1* | 6/2019 | Fu | ............... | H04L 9/30 |
| 2019/0289084 A1* | 9/2019 | Duan | ............... | G06V 10/22 |
| 2019/0379548 A1* | 12/2019 | Barrett | ............... | H04W 12/10 |
| 2020/0007797 A1* | 1/2020 | Covington | ............... | H04N 23/63 |
| 2020/0084195 A1* | 3/2020 | Levy | ............... | H04L 63/0823 |
| 2021/0067347 A1* | 3/2021 | Yu | ............... | H04L 9/3247 |
| 2021/0152372 A1* | 5/2021 | Hunt | ............... | H04L 67/02 |
| 2021/0248604 A1* | 8/2021 | Ji | ............... | G06Q 20/123 |
| 2021/0409447 A1* | 12/2021 | Dutta | ............... | H04L 69/24 |
| 2022/0141039 A1* | 5/2022 | Gray | ............... | H04L 9/3236 |
| | | | | 713/156 |
| 2023/0071022 A1* | 3/2023 | Hong | ............... | H04L 9/3265 |
| 2023/0353390 A1* | 11/2023 | Wang | ............... | G06Q 20/3821 |
| 2024/0195795 A1* | 6/2024 | Evans | ............... | H04L 9/3268 |

FOREIGN PATENT DOCUMENTS

| | | | | | |
|---|---|---|---|---|---|
| CN | 110769393 A | * | 2/2020 | ......... | H04W 12/009 |
| CN | 110855679 B | * | 11/2021 | ......... | H04L 63/0442 |
| GB | 2420888 A | * | 6/2006 | ......... | G06Q 30/02 |
| JP | 2001243330 A | * | 9/2001 | ......... | G06Q 30/02 |
| JP | 2005141656 A | * | 6/2005 | | |
| WO | WO-2020037265 A1 | * | 2/2020 | ......... | G06Q 20/12 |
| WO | WO-2021113049 A1 | * | 6/2021 | ......... | G06Q 20/065 |

* cited by examiner

SYSTEMS AND METHODS FOR SERVER-BASED TRUST STORE DISCOVERY

BACKGROUND

The security of computing resources and associated data is of high importance in many contexts, not the least of which are networked resources. As an example, organizations often utilize networks of computing devices to provide a robust set of web-based services to client systems. In many (if not most) instances, the service users want, or even need, those transmissions to be secure. Fundamentally speaking, an electronic identity "trust anchor" of sorts, which can be relied upon in and of itself without relying on another identity or signature, is needed for the digital certificates employed during a host-client network-connected relationship. Many techniques have been developed to enhance data security and deliver the requisite trust. Utilization of these techniques, however, often requires the use of additional computing resources, such as processing and memory capacity. Use of the extra resources often adds latency to electronic request fulfillment due to the performance of operations, such as encryption operations, that are performed.

A digital certificate is an electronic identity document "signed" by another electronic identity document. Digital certificates are an important part of network security, proving both a way for an entity to efficiently and safely prove ownership of a public key and a way for a network entity (such as a client, service, or network application) to prove the entity's identity. Certificate authorities ("CAs") play an important role by validating the identity of entities that request digital certificates and issuing digital certificates to entities that the CA has validated. When a CA issues a digital certificate, the CA "signs" the digital certificate using a private key belonging to the CA. A network client can verify the identity of a network service by requesting the digital certificate belonging to the network service. If the digital certificate provided by the network service is signed by the CA, and the network client is configured to trust the CA, the network client can verify the signatures on the digital certificate to confirm the identity of the network service. Publicly-trusted root CAs serve as a trust anchor and include those which are bundled, or otherwise provided, with an operating system ("OS") or browser. Private CAs, as well, can include a root CA, such as an internal one, which is trusted.

Service hosts then want to present certificates which clients trust. Network clients can be configured to trust a particular CA by identifying that CA in a trust store. If a network client trusts a particular CA, the digital certificates issued by the particular CA will be trusted by the network client. Some applications, such as some web browsers, include trust stores with large numbers of CAs, and each CA can potentially issue thousands of digital certificates. As a result, it can be very difficult for a network client to identify which CAs should be trusted or to specify which digital certificates issued by a particular authority should be trusted. Problems are compounded when an operator alters its CAs. Conventional techniques for identifying root CAs which are trusted by client devices involves undue business burdens at best and guesswork at worse.

BRIEF DESCRIPTION OF THE DRAWINGS

Various embodiments in accordance with the present disclosure will be described with reference to the drawings, in which.

DETAILED DESCRIPTION

In the following description, various illustrative embodiments will be described. For purposes of explanation, specific configurations and details are set forth to provide a thorough understanding of the embodiments. However, it will also be apparent to one skilled in the art that the embodiments may be practiced without the specific details. Furthermore, well-known features may be omitted or simplified in order not to obscure the embodiment being described. In general, the techniques described and suggested herein allow a computer system, hosted application program, network service, or other entity to, in an automated and often unsupervised fashion, learn and infer what digital certificates a service operator's client base trusts, based on a file or Uniform Resource Locator ("URL") or other identifier commonly sought by clients.

Transport Layer Security ("TLS") is a cryptographic protocol that provides end-to-end security of data sent between applications over a network. In TLS communication, root CAs are those which are already present on a client host and trusted by default. The certificates presented by network endpoints are trusted in so far that they are signed by an issuing CA, which, at some point along a so-called "chain of trust" can be traced to a trusted root CA. TLS and other protocols do not provide a way for a client to present the list of root CAs that it trusts, and, as a result, one of the difficult problems facing a Web or other hosted service operator is the determination of which root CAs their client base already trusts. As client trust stores are unknown to an online service operator and can vary by browser, OS, application framework, or even individual client applications, determining the contents of a client trust store, and which digital certificate to obtain or present, is challenging for the service operator. And the larger the operator's client base, the greater the problem.

By way of additional detail, a trust store contains a collection of trusted root certificates from certificate authorities that are trusted to identify third parties. When a digital certificate is validated, the root certificate authority of the digital certificate is identified and compared to the collection of digital certificates in the trust store. The digital certificate is trusted if the root certificate authority of the digital certificate is represented in the trust store. When a new certificate authority is added to a trust store, an application that relies on the trust store has the potential to trust all certificates issued by the new certificate authority. Some systems maintain more than one trust store. Trust stores may be deployed by web browsers, Java runtimes, computer operating systems, specific computer applications, and application-update systems. Sometimes a trust store will include intermediate certificates, to shortcut the validation process, although this is not a recommended practice for security reasons.

Knowing which CAs and certificates are trusted allows a service operator to plan for, and potentially stagger, implementation of replacement certificates, thereby avoiding a potential service outage that could occur all trusted certificates expire around the same time and are being replaced in parallel. Further, such knowledge of client trust stores permits a service operator to use the same key for all of the trusted certificates.

The present systems and methods are directed to probing, using a non-material or non-essential TLS or other protocol connection which the service operator will allow to periodically fail and accept a certain level of communication error, presenting randomly-selected digital certificates to requesting clients and monitoring the response as to whether the connection succeeds or fails. Various illustrative embodiments can determine, and adjust, a random set of potentially-trusted digital certificates relating to, for example, the familiar favicon.ico URL and monitoring the result of an attempt to connect the hosted service operator system and client devices. The favicon.ico URL, also known as the "favorite icon" or "favicon," is a frequently-requested linked file containing one or more small icons to be displayed by browser applications next to an associated URL, useful for observing which websites are open in a browser as well as for ornamental reasons. As is known in the art, given a TLS Hypertext Transfer Protocol ("HTTP") connection to a web page (for example, https://example.com), a client browser (out of habit or otherwise) will often request the favicon link from either https://example.com/favico.ico (the default) or the location specified in the <link rel="icon/> tag, making the favorite icon URL a fitting subject to test and infer the CAs in clients' trust stores. As will be seen, such a harvesting approach clearly is superior to, for example, manually requesting trust store data from client.

After first acquiring, and logging in a transparency log or other stored record, a number of generally equivalent certificates (e.g., having the same subject name, same subject alternative name ("SAN"), and same key type) from a number of different public CAs, a web or other network service operator or provider (referred to herein as a "service operator" merely for convenience) can apply an automated random sampling technique to determine the contents of a client's trust store. By randomly presenting differing certificates to clients requesting the favico.ico asset, the service operator can use TLS handshake errors to automatically infer, from successful connections, that the successful digital certificates' associated CAs appear in the clients' trust stores, and that unsuccessful connections are for certificates issued by a CA outside those trust stores. Given enough samples over enough time, and potentially applying machine learning techniques and trained models including those noted herein, the service operator can also construct a global or high-level view of the level of support for a given CA.

Notably, the present systems and methods can additionally, or alternatively, use requests, files, identifiers, and URLs other than those directed to the favorite icon. One harvesting option is to employ a Web crawler looking for the robots.txt file (a standard text file informing crawlers which URLs can be accessed on a given site, to avoid overloading the site with connection requests). In addition, a hidden image on a website, such as may be used for site tracking purposes, can be used as the basis for a received client request. Along those lines, a service operator could also, or alternatively, employ any files downloaded with the Hypertext Markup Language ("HTML") for a given website, applying JavaScript, Cascading Style Sheets ("CSS"), and the like for this purpose. While the favorite icon is frequently referenced throughout the present discussion, for the avoidance of doubt, such is merely for convenience, and such references are to be construed broadly and include additional or alternative bases for receiving and responding to client requests and otherwise probing client trust stores.

Figure 1:
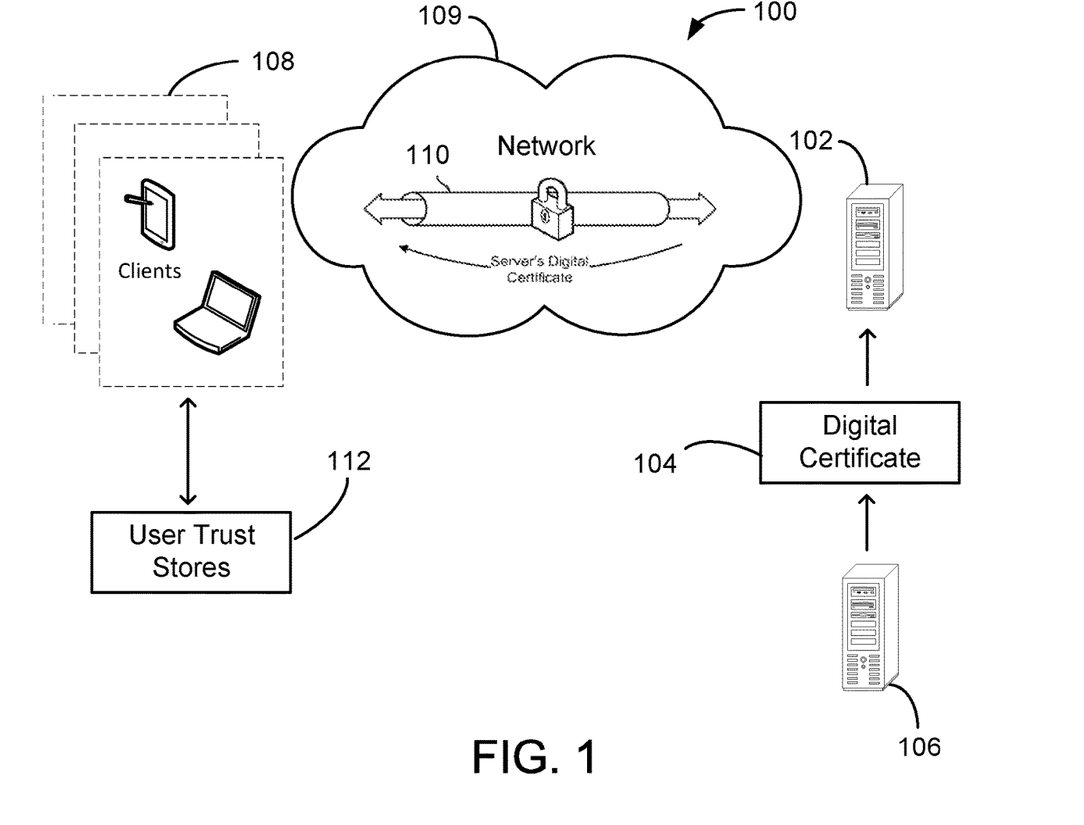
FIG. 1 illustrates an example environment in which various embodiments can be implemented.

FIG. 1 illustrates an example environment 100 in which aspects of the various embodiments can be implemented. An environment 100 includes a remote or network-based service operator and its server(s) 102 which owns one or more service digital certificates 104 issued by one or more CAs 106. The service 102 may be hosted by a server computer system or group of server computer systems. In this illustrative embodiment, a client device or computer system 108 requests, over a network 109, a secure connection to the service 102 via the TLS protocol for secure communications 110. In some embodiments, the TLS protocol connection 110 may be replaced with a QUIC general-purpose transport layer network connection, a Virtual Private Network ("VPN") connection, an Internet Protocol Security ("IPSec") connection, a Secure Sockets Layer ("SSL") connection, or another secure network connection.

A TLS "handshake" is a background communication negotiation, known to those of ordinary skill in the art, between hosting and client entities on a network to establish the details of their connection. Generally, this process involves a determination of what version of the TLS (or other) protocol will be used in the session, a selection of cryptographic algorithms, the parties authenticating each other by exchanging and validating digital certificates, and the use of asymmetric encryption techniques to generate a shared secret key, which the protocol uses in connection with the symmetric encryption of messages. More particularly, as part of the handshake process initiated in response to a request for a secure connection, the service operator 102 provides the client computer system 108 with one of the service's digital certificates 104, randomly selected by CA in some embodiments. The service digital certificate 104, for example, can be an X.509 digital certificate including an issuer field, a subject field, an issuer signature, and a subject signature. Various attribute fields can describe the validity time period, signature algorithms used, serial number, and chain of trust associated with the service's digital certificate 104.

The client computer system 108 examines the service's provided digital certificate 104 to determine whether the provided digital certificate 104 is valid. In doing so, the client computer system 108 validates the digital signatures of the service digital certificate 104. If the digital signatures on the service digital certificate 104 are not valid, the client computer system 108 determines that the service digital certificate 104 is invalid, and terminates the TLS connection 110, resulting in a handshake error which can be logged by the service operator 102. If it deems that the digital signatures on the service digital certificate 104 are valid, the client computer system 108 can examine the service digital certificate 104 and identify a root CA of the service digital certificate 104 by querying its trusted CA store 112. Such determination will conclude whether the root CA for the service digital certificate 104 is represented in the trusted CA store 112. If the root CA for the service digital certificate 104 is not present in the trusted certificate authority store 112, the client computer system 108 determines that the service digital certificate is not to be trusted and terminates the TLS connection 110. This connection error can also be logged by the service operator, via, for present purposes, records reflecting that the connection failure occurred due to the use of a root CA which does not appear in the client trust store. If the root CA of the service digital certificate 104 is present in the trusted certificate authority store 112, the client computer system 108 may apply one or more rules to determine whether the service digital certificate is trusted. On the client end, the trusted CA store 112 may include one or more application-specific trust stores containing root CAs used by application programs.

As will be discussed, in some embodiments, a certificate manager can execute on the host computer system 102. One or more applications executing on the host computer system 102 may access such certificate manager to process and/or analyze the client reaction to various CAs and connection successes or failures. The certificate manager can maintain rule sets at the application level, application group level, and client device level. The rules applied by the certificate manager may be rules defined by an administrator of the hosted service operator system 102 which apply to all applications hosted by its computer system 102 and/or may be specific to the client application requesting a digital certificate.

The client computing system 108 can include any appropriate electronic device operable to send and receive requests, messages, or other such information over an appropriate network and convey information back to a user of the device. Examples of such client systems and devices include personal computers, tablet computers, smart phones, notebook computers, and the like. The TLS communications connection 110 can take place over any appropriate network 109, including an intranet, the Internet, a cellular network, a local area network ("LAN"), or any other such network or combination, and communication over the network can be enabled via wired and/or wireless connections. For the avoidance of doubt, the term "TLS" will often be used herein as the protocol term merely for convenience, but any of various protocols can utilized with the present systems and methods.

The service operator environment 102 can include any appropriate components for receiving requests and returning information or performing actions in response to those requests, including those used in the art in connection with a distributed system. As an example, the service operator environment 102 might include Web servers and/or application servers for receiving and processing requests, then returning data, Web pages, video, audio, or other such content or information in response to client requests. In various embodiments, the service operator environment 102 may include various types of resources that can be utilized by multiple clients 108 for a variety of different purposes. In at least some embodiments, all or a portion of a given resource or set of resources might be allocated to a particular client 108 or allocated for a particular task, for at least a determined period of time. The sharing of these multi-tenant resources from an operator environment is often referred to as resource sharing, Web services, or "cloud computing," among other such terms and depending upon the specific environment and/or implementation. In an example, the service operator environment 102 includes a plurality of resources of one or more types. These types can include, for example, application servers operable to process instructions provided by a client 108 or database servers operable to process data stored in one or more data stores in response to a client 108 request. As known for such purposes, a client 108 can also reserve at least a portion of the data storage in the service operator environment 102. Methods for enabling a user to reserve various resources and resource instances are well known in the art, such that detailed description of the entire process, and explanation of all possible components, will not be discussed in detail herein.

In at least some embodiments, a client 108 wanting to utilize a portion of the service operator 102 resources can submit a request that is received by an interface layer of the service operator environment 102. The interface layer can include application programming interfaces ("APIs") or other exposed interfaces enabling a client 108 to submit requests to the service operator environment 102. An exemplary interface can also include other components as well, such as at least one Web server, routing components, load balancers, and the like. When a client 108 request to provision a resource is received by the service operator 102 interface layer, information for the request can be directed to a resource manager or other such system, service, or component configured to manage user accounts and information, resource provisioning and usage, and other such aspects. A resource manager receiving the request can perform tasks such as to authenticate an identity of the client 108 submitting the request, as well as to determine whether that client has an existing account with the service operator.

A service operator 102 resource manager (or another such system or service) may also function as a virtual layer of hardware and software components that handles control functions in addition to management actions, as may include provisioning, scaling, replication, etc. The resource manager can utilize dedicated APIs in the interface layer, where each API can be provided to receive requests for at least one specific action to be performed with respect to the computing environment. Upon receiving a request to one of the APIs, a Web services portion of the interface layer can parse or otherwise analyze the request to determine the steps or actions needed to act on or process the call.

An interface layer in at least one embodiment includes a scalable set of client-facing servers that can provide the various APIs and return the appropriate responses based on the API specifications. The interface layer also can include at least one API service layer that in one embodiment consists of stateless, replicated servers which process the externally-facing client or customer APIs. The interface layer can be responsible for Web service front end features such as authenticating clients 108 based on credentials, authorizing the clients 108, throttling customer requests to the API servers, validating client 108 input, and marshalling or unmarshalling requests and responses. In many embodiments, the Web services layer and/or API service layer will be the only externally-visible component, or the only component that is visible to, and accessible by, clients 108 of the service operator 102. The servers of the Web services layer can be stateless and scaled horizontally as known in the art. API servers, as well as the persistent data store, can be spread across multiple data centers in a region, for example, such that the servers are resilient to single data center failures.

Figure 2:
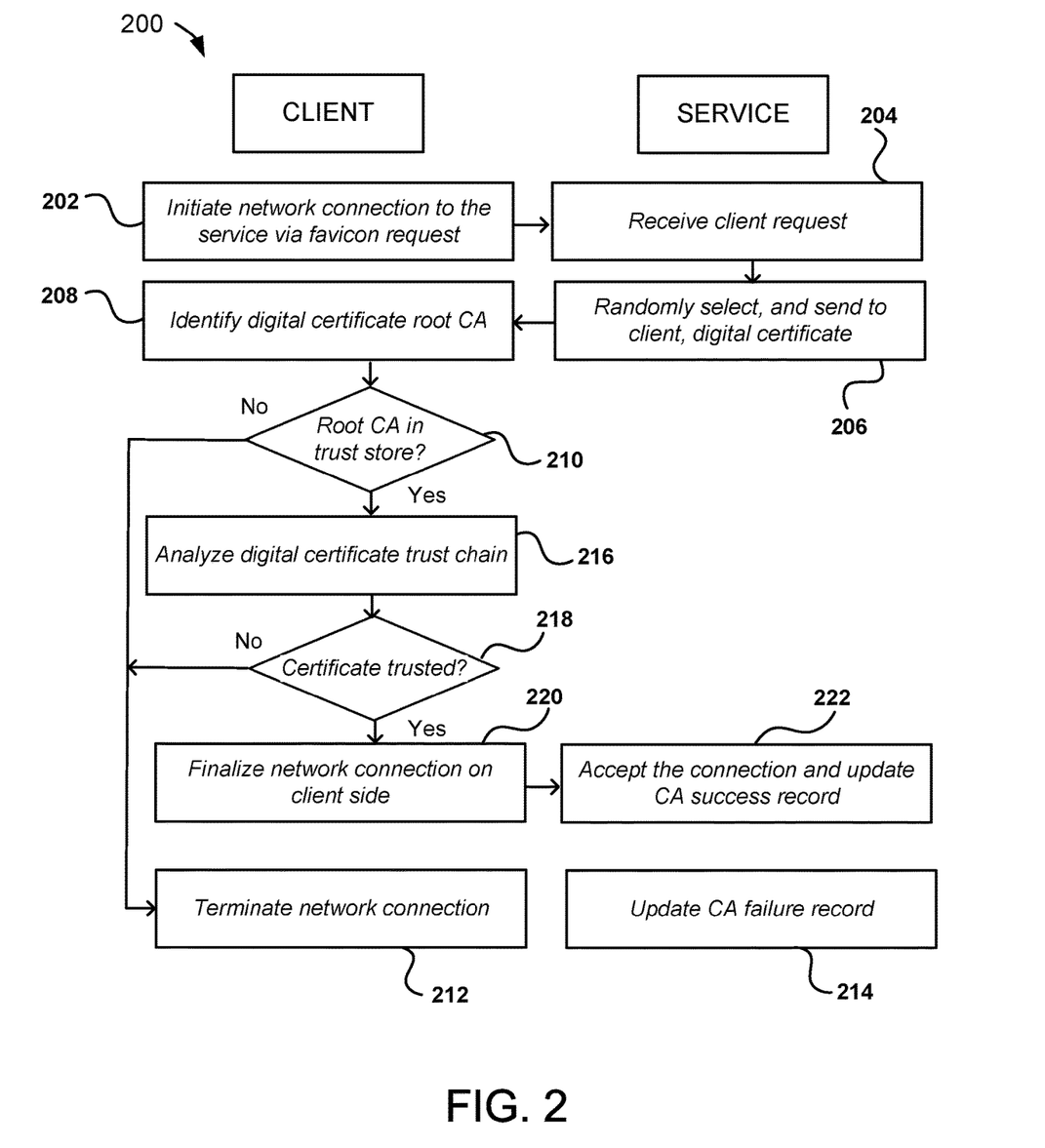
FIG. 2 illustrates an example of a process that, as a result of being performed by a service operator and a client device, evaluates the client trust store and establishes a secure network connection based at least in part on a digital certificate that identifies the service, in accordance with various embodiments.

FIG. 2 shows an illustrative flow of an example process that, in accordance with various embodiments and as a result of being performed by a service operator and a client device, evaluates certain of the client's trust store contents and establishes a secure network connection, based at least in part on a digital certificate identifying the operator's service requested by the client. A swimlane-type diagram 200 shows a process that begins at block 202 with the client initiating a favorite icon secure connection request with the service, in accordance with known techniques, including those noted herein. The service operator receives the connection request from the client at block 204. In response to receiving the connection request from the client, the service randomly selects 206, as contemplated herein, and sends to the client a digital certificate as proof of the service's identity.

In this example process, the client may then commence validation of the service's digital certificate, performed at least in part by validating the digital signatures and CAs for the service's digital certificate. The digital signatures may include a signature generated by the service, a signature generated by a root CA, and one or more signatures generated by intermediate CAs. At block 208, the client identifies a root CA for the service operator's digital certificate, and, at block 210, the client examines that root CA and determines whether the root certificate authority is represented in a trust store maintained by the client. If the root CA is not represented in the trust store, execution proceeds to block 212 where the client terminates the network connection at least because the client is unable to definitively verify the identity of the service. In that case, the service operator can update its logs and/or other records 214 regarding the particular CA resulting in a failed connection request for that client.

If the root CA is represented in the trust store, execution advances to steps 216 and 218, where the client may apply one or more rules to determine whether the client trusts the chain of trust for the presented digital certificate(s). If the constructed chain of trust is not trusted by the client, execution proceeds to block 212 and the client terminates the network connection to the service due to a lack of a trust anchor; the service operator can then update its records 214 as to the failed connection attempt. If the service's certificate chain of trust is trusted, execution proceeds to block 220, and with completion of the network connection to the service. Even with successful connection attempts, the service operator in various illustrative embodiments will update its logs 222 regarding the success of the particular certificate, CA, and chain of trust, at least as to the subject client. At this stage, the service accepts the network connection from the client and the client and the service can communicate over the network connection by means known in the art, including, but not limited to, the Hypertext Transfer Protocol Secure ("HTTPS") communication protocol.

During such a validation or attestation phase, the relevant information for each service operator subsystem can be hashed, for example, and combined with the trust chain of certification in order to provide the desired attestation. The relevant information can include the appropriate identifiers, as well as the credentials for each subsystem. The hosted service, as well as client backend systems, receiving the information can use the appropriate credentials to verify that the information is as expected, in order to provide assurance that the service operator is running in a trusted execution environment.

As noted, in various embodiments, service operator-sampled (including randomly-selected and intermediate) digital certificates and the related chains of trust, are presented to clients for validation. The digital certificate includes a number of attributes that describe properties of the digital certificate, and properties of the owner of the digital certificate. The digital certificate is verified using a chain of trust that includes a number of digital signatures. The certificate is signed by the owner of the certificate, possibly by a sequence of intermediate CAs, and by a root CA. In this vein, a service operator may, in its security arsenal, work with any number of root CAs in at least some embodiments. "Cross-signed" certificates are root certificates which also behave as intermediate certificates inside a trust store. A client verifies the information contained in a given digital certificate by verifying the signatures in the chain of trust, and by verifying that the root CA is represented in the client's trust store.

This validation occurs in some embodiments by connecting using a TLS or SSL cryptographic protocol, such as by the "handshake" process, and determine the encryption capabilities. The client validation of a certificate occurs relatively early during the standard TLS handshake process. Via that process, after a client request "hello," the requested server responds with a "hello" and presents, to the client, a certificate and related chain. Then client performs the validation As noted, as part of its tracking of which CAs appear in, and are this trusted by, client trust stores, the service operator will closely track and record connection failures and successes. Some existing services utilized by a service operator may automatically log the handshake, or connection, errors, and it is possible, to assist with present purposes, for a service operator to configure a given service to do that even if such logging is not "out of the box." TLS termination proxy servers, for example, do log such errors. The error analysis on the service operator side, in some embodiments, will distinguish between TLS connection failures errors due to a rejected certificate and errors arising for other reasons. As part of this analysis, the service operator may compare all conditions of the client request (whether a recognized user was involved, key length and type, etc.) and pinpoint that the only differing factor for the connection request was the certificate. For example, some clients cannot accept trust chains which are extremely length, and the type of error there differs from a situation where a certificate is rejected simply as unreliable. For the sake of consistency, in some embodiments, comparisons are made using trust chain lengths of similar length and/or similar key types (such as the well-established Rivest-Shamir-Adleman ("RSA") public-key in typical 2,048 to 4,096 bit sizes (e.g., an "RSA-2048 key").

The service operator may employ any of a number of algorithmic approaches in dealing with clients hereunder. As noted, in responding to favicon and other requests from clients, a random approach is used in some illustrative embodiments: namely, random selection of digital certificates to present to requesting clients, reflecting a random selection of CAs, which a service operator desires to test on one or more clients. To facilitate analyses of whether the CAs appear in client trust stores, the service operator can apply any of a number of testing algorithms, including, but not limited to, known methods such as A/B controlled variant testing (also known as "split testing"). A/B type testing, for example, entails a comparison of two versions of something to determine which one is more effective—for present purposes, this means comparison of CAs and/or digital certificates to ascertain which are found in client trust stores and which are not. This determination (including that performed by trained machine learning models) will improve over time, as the comparison data is observed, automatically and/or manually, with regard to TLS connection success. A further algorithmic approach which may be used in some embodiments is the use of decision trees, which can be built over time to assist with generating rules for specific clients and/or CAs.

Figure 3:
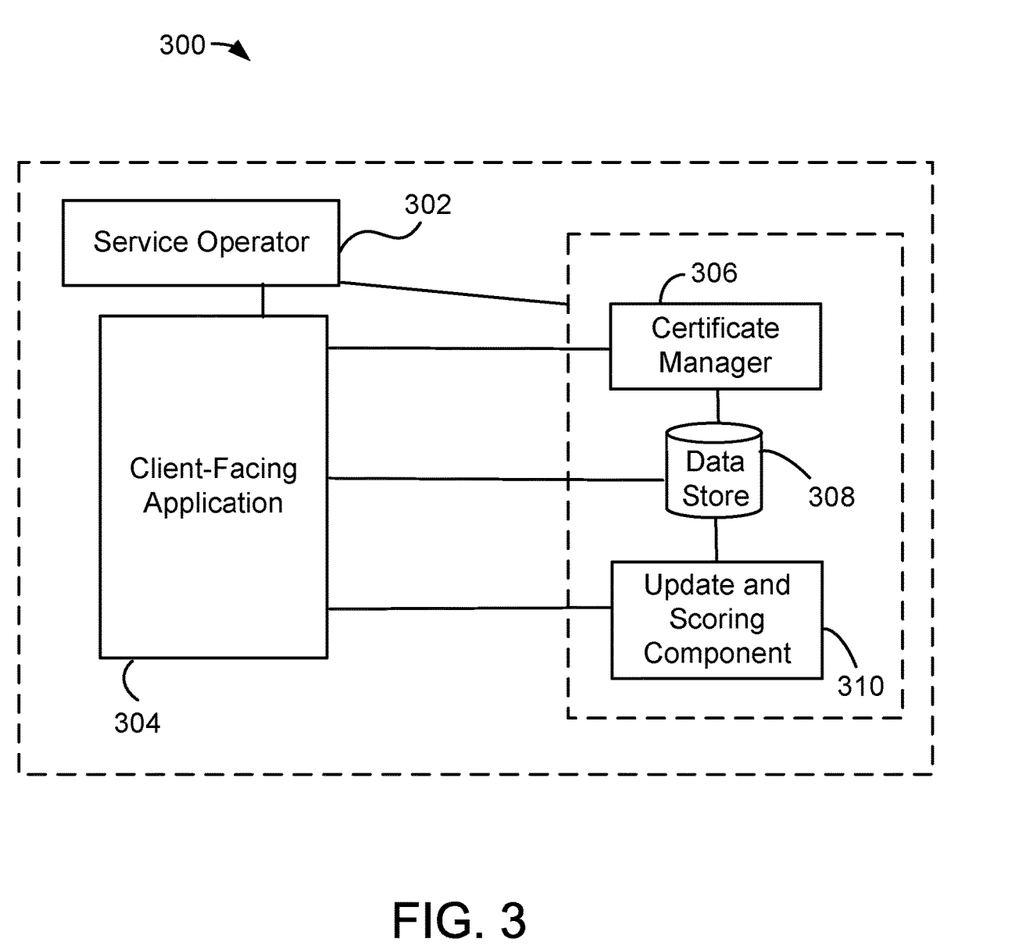
FIG. 3 is an illustrative example of a service operator computing system that uses a certificate manager to determine digital certificate in a client trust store, in accordance with an embodiment.

FIG. 3 shows an example 300 of an illustrative service operator computer system 302 which, among other things, uses a certificate manager to process requests and client responses to digital certificates and CAs, in accordance with embodiments herein. This service operator computer system 302 includes a client-facing network application 304 that is hosted by the service operator. The network application 304 can interface with a certificate manager or module 306 which, operating as a backend service or operation, may randomly select and supply one or more digital certificates to a requesting client, in order to verify the identity of the service operator, and to secure communications between the service operator and requesting client. In some embodiments, the certificate manager 306 may operate as a service, module, or component on the computer system hosting a given service, application, or the like.

In this example, the certificate manager 306 is configured to maintain a set of digital certificate selection and analysis rules, potentially housed in one or more data stores or databases 308. This service operator data store 308, in some embodiments, retains a collection of information regarding which CAs are trusted by which client systems. This collection of CA information authorities may, but need not, be managed by a service operator entity other than the entity which manages the certificate random selection and connection result logging processes.

The service operator's certificates may be accessed by a selection component (not shown, but potentially incorporated as part of the certificate manager) that can apply rules to choose digital certificates for presentation to clients via the network client application 304 and parse TLS connection terminations. When the certificate manager 306 determines that a given client considers a certain root CA is not trustworthy, additional actions may be taken. In some embodiments, the certificate manager 306, or another module, can be configured to automatically transmit an alert to one or more service operator system administrators indicating that a connection has terminated (and potentially the determined reason for same), potentially leading to automated and/or manual action by an update and scoring component 310. The actions possible by the update and scoring component 310 are open-ended by design and can include one or more of an adjustment of the rules, adjustment of the threshold values used to evaluate the rules, or other actions to bolster security of the applicable network(s) and client connection(s).

In some embodiments, the certificate manager 306 uses custom attributes added to digital certificates, to assist in the determination of whether clients find the certificates are trustworthy. Custom attributes may be added to X.509 certificates using a type and value pair contained in a certificate extension field. In one example, a custom attribute is added to a digital certificate to indicate that the applicable CA has completed a supplemental process to verify the identity of the certificate owner. The custom attributed may be added by the issuing CA or by the requesting entity prior to submission to the CA for signing. In another example, a custom attribute is added by the issuer of the digital certificate that provides additional identifying information about the certificate owner.

As noted, the certificate manager 306 may work with an update and confidence scoring component 310. The update and scoring component 310 provides a way, such as via an API which can be accessed by an administrative console, for the certificate manager 306 to (automatically and/or manually) update the rules used to determine whether a particular root CA is trustworthy. The rules may be updated, for example, when a new client connection is established, a new application is installed on the service operator's computer system, additional certificate attributes become available, or security policies are modified. Rule updates may be provided to the rule update component over an out-of-band communication channel that relies on physical media such as a CD-ROM, USB memory stick, or flash memory card, or via a secure network connection that is secured with a pinned digital certificate or stored key maintained within the rule update component.

The certificate manager 306 can maintain, or otherwise apply, a set of rules to assist the service operator in determining whether a particular digital certificate is in a client trust store. Such rules may develop over time, as the service operator works with various clients and be based on attributes of a subject digital certificate, attributes associated with CAs in the chain of trust of the subject digital certificate, or properties of a trust chain. The certificate manager can maintain multiple sets of rules, each set of rules adapted to the requirements of a particular application and/or a particular client. In one example, a rule could require that, in order to be trusted by a particular application, digital certificates issued by a particular root CA be signed using an approved signing algorithm. In another example, a rule requires that, in order to be trusted by a particular application, digital certificates issued by a particular root CA not be signed by an intermediate CA. Client-specific rules may examine the attributes of a particular digital certificate, the root CA of the digital certificate, or the chain of trust of the digital certificate. Certain rules may restrict the set of trusted certificates issued by a particular CA, while some rules may define a subset of trusted root certificates from a trust store for use with a particular application. And certain rules may impose universal requirements on certificates presented to a particular client.

Figure 4:
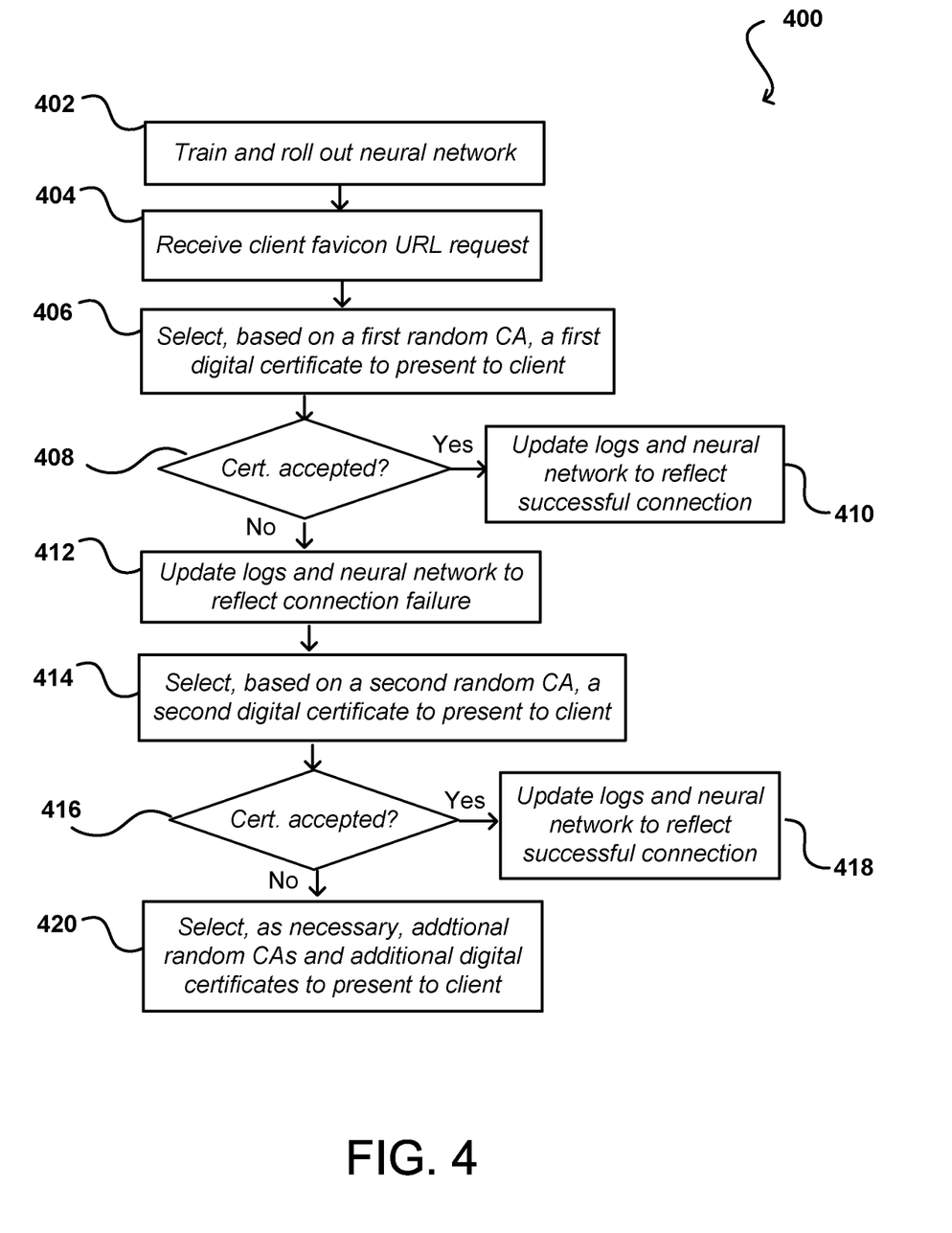
FIG. 4 illustrates an example process flow, for client trust store discover, which can be utilized in accordance with various embodiments.

FIG. 4 shows an example process 400 for server-based discovery and analysis, by a service operator, of CAs appearing in a client system trust store in accordance with various embodiments. Following acquisition and logging of digital certificates and the associated CA, this illustrative process commences at block 402, where a service operator trains a neural network on one more data sets and puts the trained neural network into production use. As is known in the neural network and artificial intelligence arts, a variety of neural network types could be applied by the service operator, including, but by no means limited to, feedforward, recurrent, radial basis function, modular, and self-organizing neural networks. Prior to production environment use, a non-production sample data set of typical CA content and client trust stores may be employed for training a neural network model for processing subject content. Although graphics processing units ("GPUs") are effective for many deep learning neural network applications, the present systems and methods can be used with GPU-based or central processing unit ("CPU")-based systems.

More particularly, with the emergence of the deep convolutional neural network ("CNN"), a programming and information processing paradigm allowing a machine to learn from data, object detection performance has improved significantly. CNNs are a family of statistical learning models used in machine learning applications to estimate or approximate functions which depend on a large number of inputs. The various inputs are interconnected with the connections having numeric weights that can be tuned over time, enabling the networks to be capable of "learning" based on additional information. The adaptive numeric weights can be thought of as connection strengths between various inputs of the network, although the networks can include both adaptive and non-adaptive components. CNNs exploit spatially-local correlation by enforcing a local connectivity pattern between nodes of adjacent layers of the network. Different layers of the network can be composed for different purposes, such as convolution and sub-sampling. There is an input layer, which along with a set of adjacent layers, forms the convolution portion of the network. The bottom layer of the convolution layer, along with a lower layer and an output layer, makes up the fully-connected portion of the network. A number of output values can be determined from the output layer, which can include several items determined to be related to an input item, among other such options. As will be seen, and would be evident to those in the art, neural network, deep learning, and other machine learning techniques have a number of applications for present purposes.

In some embodiments, following training and production rollout of at least one neural network, the service operator receives 404 a client system connection request seeking the service operator's favorite icon URL. The request that is received may be formatted in various ways. For example, in some embodiments, the request is a web service request received over a network. The request may be transmitted in accordance with an application level protocol, such as HTTP. In an example, a cryptographic key can be accessed for verifying a digital signature of the received request. Accessing the cryptographic key may be performed in various ways in accordance with various embodiments. An identity of an entity that submitted the request may be associated with the cryptographic key that is usable to verify digital signatures submitted by that identity. As another example, the request may include an identifier of a cryptographic key that enables selection of a suitable cryptographic key based in part on the identifier included in the request. Generally, any way by which a suitable cryptographic key usable for verifying the request is determinable may be used.

After accessing the cryptographic key, a determination can be made as to whether the digital signature is valid. In some embodiments, the cryptographic key is a symmetric cryptographic key and determining whether the digital signature is valid may include generating a reference digital signature of the request (or portion thereof) and determining whether the reference signature matches the digital signature that was received with the request. If it is determined that the signature is not valid, the request may be denied. The request may be denied in various ways in accordance with various embodiments. For example, in some embodiments, denying the request includes providing a response to the client indicating that the request is denied, possibly with one or more reasons for the denial. Other ways by which a request may be denied may involve performing no additional operations in connection with the request. Generally denying the request may include any suitable way of avoiding fulfillment of the request.

If, however, it is determined that the signature is valid, an appropriate signing key can be accessed. In one embodiment, a signing key is a cryptographic key usable to digitally sign a storage operation command to enable submission of the storage operation command along with the digital signature such that the digital signature can be successfully verified upon receipt and the storage operation command will, as a result, be fulfilled. The signing key that is accessed may vary. In some examples, the signing key is the same cryptographic key used to verify the digital signature of the request. In other examples, the signing key is a key derived based at least in part on the cryptographic key used for verifying the digital signature of the request. In yet another example, the signing key may be a cryptographic key from which the cryptographic key used for verifying the digital signature of the request is derived. In a further example, neither the signing key nor the cryptographic key used for verifying the digital signature of the request is derived from the other. It should be noted that in embodiments where the cryptographic key used for verifying the digital signature of the request and the signing key are the same, the operation of accessing the signing key may have already been performed and thus may be considered to not be a separate operation.

Assuming an acceptable client request, at step 406, the service operator randomly selects (potentially by CA) a first digital certificate, which has an associated CA that is logged or otherwise recorded by the operator for analyses including those hereunder, for presentation to the client. In some embodiments, this, and other certificate-related tasks on the service operator side, may be handled, in whole or in part, by a certificate manager component, module, or the like. On the heels of that selection, the service operator then sends the first random digital certificate to the requesting client. At step 408, the service operator determines whether the client accepted the first digital certificate. If so, at step 410, the service operator updates its logs and any other applicable records, as well as the trained neural network model, regarding the first digital certificate and how the applicable CA appears in that client's trust store. If the client rejects the first digital certificate, after receiving an acknowledgement of such, the service operator updates 412 its certificate and CA records accordingly, as well as the trained neural network model, and randomly selects a second digital certificate for transmission to the client at step 414. At step 416, the service operator determines whether the client accepted the second digital certificate, with the logs and neural network model updated as applicable at steps 418 and 420.

Should the second digital certificate also be rejected by the requesting client, the process may be repeated, with the service operator randomly selecting additional digital certificates as needed and monitoring whether associated CAs are in the client's trust store, by virtue of the client accepting the proffered certificate and finalizing the TLS handshake process.

Statistical techniques may be applied by the service operator, including by its trained neural network(s), in some embodiments to perform analysis of acquired connection success and other data, allowing the operator to infer client trust store contents and other information based on cached favicon data. Further, this sort of processing can part of a scoring system that is offered, internally and/or externally, as a separate service to other, third-party providers, proffering data as to the most trusted CAs. In some examples of this implementation, a certificate manager includes a separate component or module for this scoring. The certificate manager then, as part of determining whether a give root CA is generally considered trustworthy, may infer or otherwise compute a confidence or other score that represents one or more clients' level of trust for that CA. Such a score can be determined based at least in part on a TLS connection success or failure rate for a given digital certificate, a determined quality of the CAs and/or other characteristics listed in the chain of trust of the digital certificate, the age of the digital certificate, the strength of the signature algorithms used in the digital certificate, and any other number of factors. In some embodiments, the score for a given CA is determined by combining scores determined for the root CA of the digital certificate and any intermediate CAs in the trust chain for that certificate. The score may be compared to a minimum trust score threshold value which may be specific to a particular service operator application. If the score is greater than the minimum trust threshold value, the subject CA is deemed generally trustworthy; if the score is less than or equal to the minimum trust threshold value, the CA can be deemed not generally trustworthy. In some examples, the threshold value is set by an administrator for the service operator computer system. In another example, the threshold value is supplied by an application. In yet another example, the threshold value may be provided by a network service; the network service can provide particular threshold values to a certificate manager based at least in part on the particular applications and client computer systems serviced.

Figure 5:
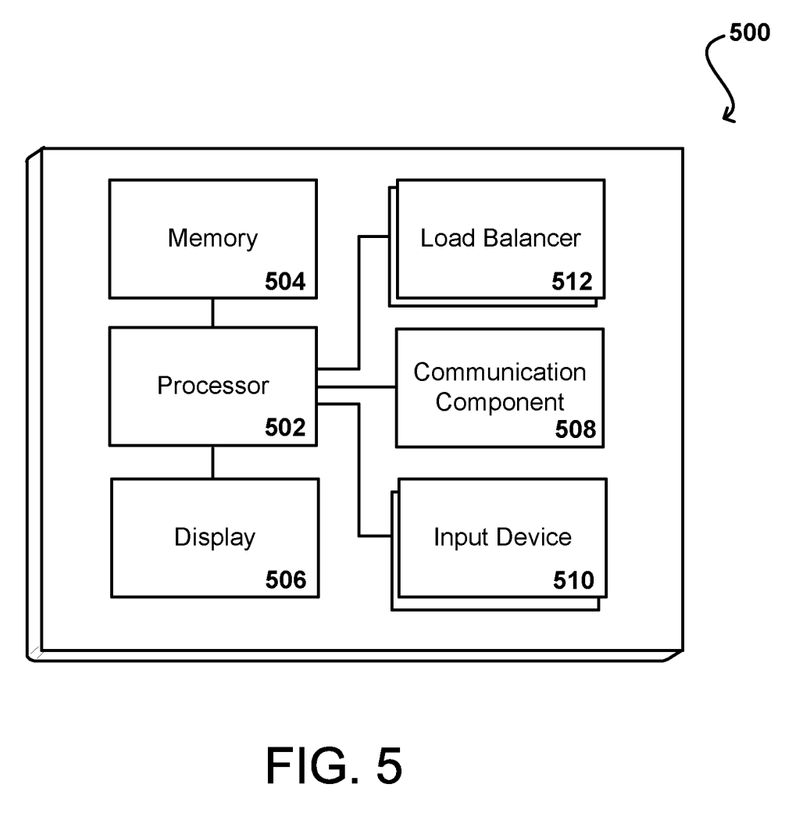
FIG. 5 illustrates example components of a computing device that can be utilized in accordance with various embodiments.

FIG. 5 illustrates a set of basic components of an example service operator computing system 500 that can be utilized to implement aspects of the various embodiments. In this example, the system includes at least one computing device having at least one processor 502 for executing instructions that can be stored in a memory device or element 504. The system's computing device can include any appropriate device operable to send and receive requests, messages or information over an appropriate network and convey information back to a user of the device. Examples of such computing devices include personal computers, cell phones, handheld messaging devices, laptop computers, set-top boxes, personal data assistants, electronic book readers, and the like. As would be apparent to one of ordinary skill in the art, the device can include many types of memory, data storage or computer-readable media, such as a first data storage for program instructions for execution by the at least one processor 502, the same or separate storage can be used for images or data, a removable memory can be available for sharing information with other devices, and any number of communication approaches can be available for sharing with other devices. The device may include at least one type of display element 506, such as a touch screen, electronic ink ("e-ink"), organic light emitting diode ("OLED") or liquid crystal display ("LCD"), although devices such as servers might convey information via other means, such as through a system of lights and data transmissions. The device typically will include one or more network communication components 508, such as a port, network interface card, or wireless transceiver that enables communication over at least one network. The device can include at least one input device 510 able to receive conventional input from a user. This conventional input can include, for example, a push button, touch pad, touch screen, wheel, joystick, keyboard, mouse, trackball, keypad or any other such device or element whereby a user can input a command to the device. These I/O devices 510 could even be connected by a wireless infrared or Bluetooth or other link as well in some embodiments. In some embodiments, however, such a device 510 might not include any buttons at all and might be controlled only through a combination of visual and audio commands such that a user can control the device 510 without having to be in contact with it.

As discussed, different approaches can be implemented in various environments in accordance with the described embodiments. In some illustrative embodiments, hardware and/or software-based load balancing techniques 512 can handle the random selection of digital certificates and direct network traffic across a cluster of application servers and network nodes, with each node having digital certificates which differ from the other nodes. In addition, or alternatively, a network node could have its own random certificate selection capability. As will be appreciated, although a Web-based environment is used for purposes of explanation in several examples presented herein, different environments may be used, as appropriate, to implement various embodiments. The network can include any appropriate network, including an intranet, the internet, a cellular network, a LAN, any other such network, or a combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In internet-based example embodiments, the environment includes a Web server for receiving requests and serving content in response thereto, although for other networks, an alternative device serving a similar purpose could be used, as would be apparent to one of ordinary skill in the art.

The illustrative environment can include at least one application server and a data store. It should be understood that there can be several application servers, layers or other elements, processes or components, which may be chained or otherwise configured, which can interact to perform tasks such as obtaining data from an appropriate data store. As used herein, the terms "database" and "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content on the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto.

Each server typically will include an OS that provides executable program instructions for the general administration and operation of that server and include computer-readable medium storing instructions that, when executed by a processor of the server, allow the server to perform its intended functions. Suitable implementations for the OS and general functionality of the servers are known or commercially available and are readily implemented by persons having ordinary skill in the art, particularly in light of the disclosure herein. The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. Client or user devices can include any of a number of general purpose personal computers, such as desktop or laptop computers running a standard OS, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. Again, the network can be, for example, a LAN, a wide-area network ("WAN"), a virtual private network ("VPN"), the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java©, C, C#, C++, or any scripting language, such as Perl, Python, or TCL, as well as combinations thereof. The server(s) may also include database servers, including, without limitation, those commercially available from Oracle©, Microsoft*, Sybase© and IBM© as well as open-source servers such as MySQL, Postgres, SQLite, MongoDB, and any other server capable of storing, retrieving, and accessing structured or unstructured data. Database and data store servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one CPU, at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk ("DVD") or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented system, comprising:
 a server of a host computing system having at least one processor; and
 memory including instructions that, when executed by the at least one processor, cause the system to:

acquire, by the server, a set of digital certificates, each of the digital certificates associated with a root certificate authority of a plurality of root certificate authorities;

receive, by the server, a handshake request from a client electronic device to establish a secure Hypertext Transfer Protocol Secure ("HTTPS") network connection, with the host computing system, using the Transport Layer Security ("TLS") protocol, the request seeking a favicon associated with a website of the host computing system;

transmit, by the server to the client electronic device, a first digital certificate, the first digital certificate included in the set of digital certificates and associated with a first root certificate authority randomly selected from among the plurality of root certificate authorities;

determine, by the server based at least in part on a failure of the request, that the first root certificate authority is not represented in a client trust store;

update, by the server and based on the failure of the request, a root certificate log;

transmit, by the server to the client electronic device, a second digital certificate, the second digital certificate included in the set of digital certificates and associated with a second root certificate authority randomly selected from among the plurality of root certificate authorities;

determine, by the server based at least in part on a success of the request, that the second root certificate authority is represented in the client trust store; and update, by the server and based on the success of the request, the root certificate log.

2. The computer-implemented system of claim 1, wherein the instructions, when executed by the at least one processor, further cause the system to:

apply a TLS handshake process to verify the client electronic device and establish an encryption algorithm and a session key for the secure HTTPS network connection.

3. The computer-implemented system of claim 1, wherein the instructions, when executed by the at least one processor, further cause the system to:

perform an A/B test on the plurality of root certificate authorities, the A/B test including the first root certificate authority and the second root certificate authority.

4. The computer-implemented system of claim 1, wherein the instructions, when executed by the at least one processor, further cause the system to:

generate at least one client-specific certificate authority rule based at least in part on the root certificate log.

5. A computer-implemented method, comprising:

acquiring, by a server of a host computing system, a set of digital certificates, each of the digital certificates associated with a root certificate authority of a plurality of root certificate authorities;

receiving, by the server, a handshake request from a client electronic device to establish a secure Hypertext Transfer Protocol Secure ("HTTPS") network connection, with the host computing system, using the Transport Layer Security ("TLS") protocol, the request seeking a favicon associated with a website of the host computing system;

transmitting, by the server to the client electronic device, a first digital certificate, the first digital certificate included in the set of digital certificates and associated with a first root certificate authority randomly selected from among the plurality of root certificate authorities;

determining, by the server based at least in part on a failure of the request, that the first root certificate authority is not represented in a client trust store;

update, by the server and based on the failure of the request, a root certificate log;

transmitting, by the server to the client electronic device, a second digital certificate, the second digital certificate included in the set of digital certificates and associated with a second root certificate authority randomly selected from among the plurality of root certificate authorities;

determining, by the server based at least in part on a success of the request, that the second root certificate authority is represented in the client trust store; and updating, by the server and based on the success of the request, the root certificate log.

6. The complemented-implemented method of claim 5, further comprising:

applying a TLS handshake process to verify the client electronic device and establish an encryption algorithm and a session key for the secure HTTPS network connection.

7. The complemented-implemented method of claim 5, further comprising:

performing an A/B test on the plurality of root certificate authorities, the A/B test including the first root certificate authority and the second root certificate authority.

8. The complemented-implemented method of claim 5, wherein the set of digital certificates comprises digital certificates issued by differing certificate authorities of the plurality of certificate authorities, a same subject name, a same subject alternative name ("SAN"), and a same key type.

9. The complemented-implemented method of claim 5, further comprising:

recording, in the root certificate log, the success of the request; and determining, based at least in part on the root certificate log, a confidence score for the first root certificate authority.

10. The complemented-implemented method of claim 5, further comprising:

generating an application-specific rule for discovering contents of the client trust store, the application-specific rule based at least in part on an application associated with the host computing system.

11. The complemented-implemented method of claim 10, further comprising:

determining that the at least one digital certificate is trusted by the client device based at least in part on application of the application-specific rule.

12. The complemented-implemented method of claim 5, further comprising:

training at least one neural network using a data set, the data set including information associated with the plurality of root certificate authorities potentially in trust stores; and applying the at least one neural network to perform, based on a statistical model, at least one of inferring which of the plurality of root certificate authorities are preferable for presenting to users or determining a confidence score for one or more of the certificate authorities in the plurality of root certificate authorities.

13. A non-transitory computer-readable medium storing instructions that, when executed by at least one processor, cause the at least one processor to:
- acquire, by a server of a host computing system, a set of digital certificates, each of the digital certificates associated with a root certificate authority of a plurality of root certificate authorities;
- receive, by the server, a handshake request from a client electronic device to establish a secure Hypertext Transfer Protocol Secure ("HTTPS") network connection, with the host computing system, using the Transport Layer Security ("TLS") protocol, the request seeking a favicon associated with a website of the host computing system;
- transmit, by the server to the client electronic device, a first digital certificate, the first digital certificate included in the set of digital certificates and associated with a first root certificate authority randomly selected from among the plurality of root certificate authorities;
- determine, by the server based at least in part on a failure of the request, that the first root certificate authority is not represented in a client trust store;
- update, by the server and based on the failure of the request, a root certificate log;
- transmit, by the server to the client electronic device, a second digital certificate, the second digital certificate included in the set of digital certificates and associated with a second root certificate authority randomly selected from among the plurality of root certificate authorities;
- determine, by the server based at least in part on a success of the request, that the second root certificate authority is represented in the client trust store; and
- update, by the server and based on the success of the request, the root certificate log.

14. The non-transitory computer-readable medium of claim 13, wherein the instructions when executed by the at least one processor, further cause the at least one processor to: apply a TLS handshake process to verify the client electronic device and establish an encryption algorithm and a session key for the secure HTTPS network connection.

15. The non-transitory computer-readable medium of claim 13, wherein the instructions, when executed, further cause the at least one processor to: transmit, by the server to the client electronic device, one or more additional digital certificates, the one or more additional digital certificates included in the set of digital certificates and associated with one or more additional root certificate authorities of the plurality of certificate authorities.

16. The non-transitory computer-readable medium of claim 15, wherein the instructions, when executed, further cause the at least one processor to: perform an A/B test on the plurality of root certificate authorities, the plurality of root certificate authorities including the first root certificate authority and the one or more additional root certificate authorities of the plurality of certificate authorities.

17. The non-transitory computer-readable medium of claim 13, wherein the instructions, when executed, further cause the at least one processor to: train at least one neural network using a data set, the data set including information associated with the plurality of root certificate authorities potentially in trust stores; and apply the at least one neural network to perform, based on a statistical model, at least one of inferring which of the plurality of root certificate authorities are preferable for presenting to users or determining a confidence score for one or more of the certificate authorities in the plurality of root certificate authorities.

18. The non-transitory computer-readable medium of claim 13, wherein the instructions, when executed, further cause the at least one processor to: generate a client-specific rule for discovering contents of the client trust store, the client-specific rule based at least in part on an identity of the client electronic device.

19. The non-transitory computer-readable medium of claim 13, wherein the instructions, when executed, further cause the at least one processor to: determine that the failure occurred due to a length of a chain of trust or an unreliable network connection.

20. The non-transitory computer-readable medium of claim 13, wherein the instructions, when executed, further cause the at least one processor to: track the request via a pixel hidden on the client electronic device, pursuant to at least one of Hypertext Markup Language ("HTML"), JavaScript, or Cascading Style Sheets ("CSS") code executed on the host computing system.

* * * * *